Oct. 29, 1957     A. W. COURTNEY, JR     2,811,019
OVERLOAD PROTECTION CIRCUITS FOR MOTORS OF
REFRIGERANT COMPRESSORS
Filed Feb. 28, 1956
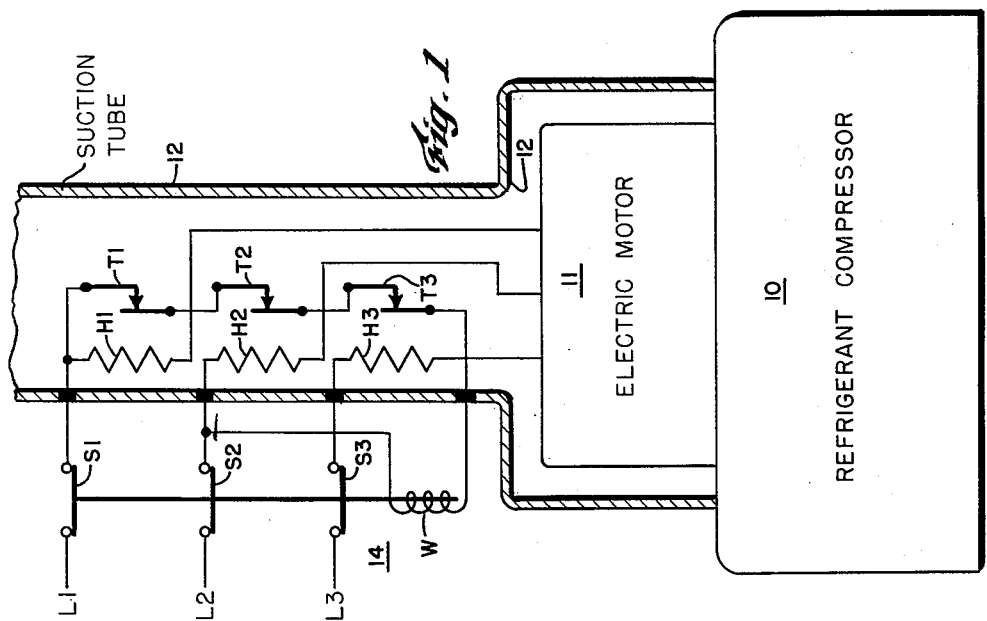
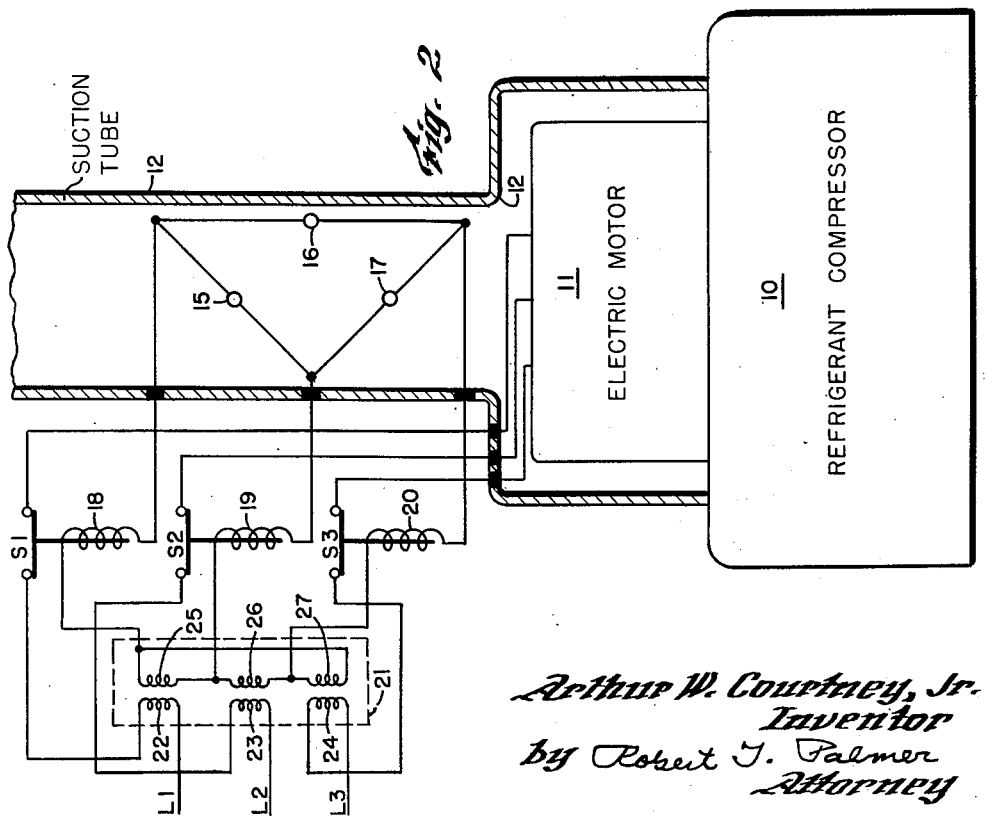
Arthur W. Courtney, Jr.
Inventor
by Robert J. Palmer
Attorney United States Patent Office 2,811,019
Patented Oct. 29, 1957

2,811,019

OVERLOAD PROTECTION CIRCUITS FOR MOTORS OF REFRIGERANT COMPRESSORS

Arthur W. Courtney, Jr., Grottoes, Va., assignor to Westinghouse Electric Corporation, Pittsburgh, Pa., a corporation of Pennsylvania Application February 28, 1956, Serial No. 568,255

2 Claims. (Cl. 62—4)

This invention relates to overload protection for electric motors driving hermetically sealed refrigerant compressors.

Electric motors driving refrigerant compressors usually have external overload relays which open the energizing circuits of the motors when abnormal currents are drawn by the motors. Such overload protection is not satisfactory for the motors of hermetically sealed refrigerant compressors, such for example, as is disclosed in the E. A. Wolfert Patent No. 2,283,024. One reason is that such a motor can operate at much higher loads without overload than an open motor of the same frame size since it is cooled by refrigerant returning to the compressor. Another reason is that the highest motor temperature may not occur when the motor draws maximum current. Generally, the motor will be coolest at high currents because high loads occur when motor cooling is maximum. Use of the conventional current sensitive, overload relays which are set to operate at currents which produce the maximum motor temperatures tolerable at selected loads, will result in nuisance tripping at higher loads when there is no need for it.

I overcome the disadvantages of prior overload protective devices by placing the current sensing element of an overload protective device in the suction line of a hermetically sealed compressor where it is exposed to the same conditions to which the motor driving the compressor is exposed. The effect of the refrigerant atmosphere on a current sensing element so located is more than simply one of temperature. A more important effect is that of the mass velocity of the suction gas past the current sensitive element. As the suction gas becomes less dense, the current sensing element becomes more sensitive. In the less dense gas the motor heating is more pronounced, and higher ultimate winding temperatures are reached. At very high gas densities such as occur at high suction pressures or evaporating temperatures, the cooling effect of the suction gas is increased, and the winding temperature is relatively low. These effects are more pronounced at standstill. Then, there is no gas velocity, and, therefore, no cooling effect other than that of natural convection. Thus, an overload sensing element immersed in a refrigerant atmosphere is very sensitive to locked rotor conditions, and will take a motor off the line very rapidly. Yet, it will not take the motor off the line under high load conditions when the motor is operating normally unless there is a real overload.

In one embodiment of this invention, a thermal type overload relay heater with its thermostatic element is placed in a motor supply circuit, and located in the suction tube of a hermetically sealed refrigerant compressor, the heater being cooled in exactly the same manner as the motor. It is also heated in the same manner since current drawn by the motor will flow through it.

In another embodiment of this invention, a resistor having a negative temperature coefficient such as a thermistor, is connected in the electric supply circuit of a motor, and located in the suction tube of a hermetically sealed refrigerant compressor driven by the motor. This resistor is connected in the energizing circuit of an overload relay. Current proportional to the load current of the motor is flowed through the resistor. The resistance of the resistor increases as it is cooled by the suction gas, reducing the current flow through the relay winding, and preventing the tripping at high loads which are not overloads as ordinarily would occur.

An object of this invention is to provide proper overload protection for an electric motor driving a hermetically sealed refrigerant compressor.

Another object of this invention is to expose the current sensing element of an overload protective device for an electric motor driving a refrigerant compressor, to the same ambient conditions of gas temperature, density and velocity to which the motor is exposed.

This invention will now be described with reference to the annexed drawings, of which:

Fig. 1 is a diagrammatic view of one embodiment of this invention, using overload relay heaters and their thermostatic elements in the suction tube of a hermetically sealed refrigerant compressor, and Fig. 2 is a diagrammatic view of another embodiment of this invention using resistors having negative temperature coefficients, in the suction tube of a hermetically sealed refrigerant compressor, for controlling an overload relay.

Referring first to Fig. 1 of the drawings, a conventional hermetically sealed refrigerant compressor 10 has a three-phase electric driving motor 11 over which the refrigerant in the suction tube 12 flows. The compressor may be of the type disclosed in detail in said Wolfert patent. The motor is connected to a three-phase supply source, the line L1 of which is connected in series with switch S1 of an overload relay 14, and electric heating element H1 and one phase connection of the motor; the line L2 of which is connected in series with a switch S2 of the relay 14, a second electric heating element H2 and a second phase connection of the motor, and the line L3 of which is connected in series with the switch S3 of the relay 14, a third electric heating element H3 and a third phase connection of the motor.

The heaters H1, H2 and H3 are located in the suction tube 12 adjacent the thermostatic switches T1, T2 and T3 respectively, each of which is adapted to be heated by its respective heater as is common in thermal type protective devices.

Preferably the switches T1, T2 and T3 are of the hermetically sealed type such as is disclosed in the Parr Patent No. 2,516,584.

The thermostatic switches T1, T2 and T3 are connected in series through the switch S1 to L1, and through the energizing winding W of the relay 14, and the switch S2 to L2. Normally S1, S2 and S3 are closed.

In the operation of Fig. 1, the current drawn by the motor 11 flows through the heaters H1, H2 and H3, causing them to become heated in proportion to the current, and to heat the switches T1, T2 and T3 respectively. When the load current increases to an abnormal amount, the switches T1, T2 and T3 will be heated sufficiently to cause them to open their contacts and thereby open the energizing circuit of the relay winding W, causing the relay to become deenergized and open the switches S1, S2 and S3, thereby stopping the motor.

Since the heaters H1, H2 and H3 and their thermostatic switches T1, T2 and T3 respectively, are cooled by the suction gas entering the compressor, higher currents than normally would be required to create them, are required, so that the motor 11 which also is cooled by the suction gas will continue to operate during periods it otherwise would be unnecessarily stopped.

Referring now to Fig. 2, three thermistors 15, 16 and 17 are placed within a suction tube 12 of a compressor 10, and are electrically connected in delta, and through energizing windings 18, 19 and 20 respectively of switches S1, S2 and S3 respectively, to the secondary windings 25, 26 and 27 respectively, of a current transformer 21.

The three-phase connections of the motor 11 and the primary windings 22, 23 and 24 of a current transformer 21, are connected in series to the lines L1, L2 and L3 respectively through the switches S1, S2 and S3 respectively.

The secondary windings 25, 26 and 27 of the current transformer are connected in delta for reducing the number of wires passing through the wall of the suction tube 12. Where wires pass through the wall of the suction tube in both Figs. 1 and 2, the openings around the wire would be filled with an electric insulating and refrigerant sealing material such as is commonly used for the energizing wires of electric motors driving hermetically sealed compressors.

In the operation of Fig. 2, current drawn by the motor 11 flows through the primary windings 22, 23 and 24 of the current transformer 21. Current proportional to that current is induced in the secondary windings 25, 26 and 27 of the current transformer and flows through the switch windings 18, 19 and 20 respectively, and through the thermistors 15, 16 and 17 respectively. An abnormal increase in current will result in the switch windings 18, 19 and 20 being energized sufficiently for the switches S1, S2 and S3 to become opened and stopping the compressor motor. The thermistors through being cooled by the suction gas have their resistances increased and thereby reduce the current flowing through the switch windings so that the compressor motor will continue in operation during periods it ordinarily would be stopped.

While embodiments of this invention have been described for the purpose of illustration, it should be understood that the invention is not limited to the exact apparatus and circuits illustrated by the drawings, since modifications thereof may be suggested by those skilled in the art, without departure from the essence of the invention.

What it claimed is:

1. In combination with a hermetically sealed refrigerant compressor having a suction gas passage and an electric motor for driving said compressor in said passage, an electric supply circuit for said motor, an overload switch in said circuit, current responsive means for opening said switch, a resistor having a negative temperature coefficient in said passage, and means for flowing current proportional to the current flowing in said circuit through said resistor and said current responsive means.

2. The invention claimed in claim 1 in which said current flowing means comprises a current transformer having a primary winding connected to said supply circuit and having a secondary winding connected in series with said resistor and said current responsive means.

References Cited in the file of this patent

UNITED STATES PATENTS

| | | |
|---|---|---|
| 1,903,491 | Wilms | Apr. 11, 1933 |
| 2,412,981 | Harrold | Dec. 24, 1946 |